(12) United States Patent
Cho et al.

(10) Patent No.: US 8,188,979 B2
(45) Date of Patent: May 29, 2012

(54) DISPLAY DEVICE AND VOLTAGE ADJUSTING METHOD THEREFOR

(75) Inventors: Man-Seung Cho, Seoul (KR);
Hyung-Guel Kim, Yongin-si (KR);
Kee-Han Uh, Yongin-si (KR);
Joo-Hyung Lee, Gwacheon-si (KR);
Jong-Woung Park, Seongnam-si (KR);
Myung-Woo Lee, Seoul (KR);
Young-Ok Cha, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 991 days.

(21) Appl. No.: 11/710,309

(22) Filed: Feb. 22, 2007

(65) Prior Publication Data
US 2007/0200832 A1   Aug. 30, 2007

(30) Foreign Application Priority Data
Feb. 24, 2006   (KR) .................. 10-2006-0018085

(51) Int. Cl.
*G06F 3/041* (2006.01)
(52) U.S. Cl. ........................................ 345/173
(58) Field of Classification Search .................. 345/104, 345/156–180; 178/18.01–19.06; 463/37; 315/169.2
See application file for complete search history.

(56) References Cited

U.S. PATENT DOCUMENTS

| | | | | |
|---|---|---|---|---|
| 4,281,323 A | * | 7/1981 | Burnett et al. ................. | 345/174 |
| 4,680,429 A | * | 7/1987 | Murdock et al. ........... | 178/20.02 |
| 5,841,078 A | * | 11/1998 | Miller et al. ................ | 178/18.06 |
| 6,075,520 A | * | 6/2000 | Inoue et al. .................... | 345/173 |
| 6,646,634 B2 | | 11/2003 | Berelovich et al. | |
| 2003/0156087 A1 | | 8/2003 | Boer et al. | |
| 2004/0104827 A1 | | 6/2004 | Katsuki et al. | |

FOREIGN PATENT DOCUMENTS

| | | |
|---|---|---|
| CN | 1315569 | 10/2001 |
| CN | 1397870 | 2/2003 |
| CN | 1471072 | 1/2004 |
| CN | 2663918 | 12/2004 |

(Continued)

OTHER PUBLICATIONS

English Language Abstract, KR Patent First Publication No. 10-0469499, Jan. 22, 2005, 1 page.

(Continued)

*Primary Examiner* — Nitin Patel
*Assistant Examiner* — Carolyn R Edwards
(74) *Attorney, Agent, or Firm* — Innovation Counsel LLP (57) ABSTRACT

A display device includes: a plurality of sensing data lines; a plurality of sensing units that output sensing signals through the plurality of sensing data lines; a signal selector that selects one sensing signal among the plurality of sensing signals; an automatic voltage adjusting unit that, when one sensing signal is selected by the signal selector, performs a controlling operation so as to allow a magnitude of the selected sensing signal to be in a predetermined range; and a voltage generator that adjusts the magnitude of the voltage applied to the sensing data lines based on a control signal output from the automatic voltage adjusting unit. According to the voltage adjusting operation, the sensing signal output through the sensing data line is always in an appropriate range. As a result, the touch determining operation on the sensing units can be accurately performed, so that it is possible to improve reliability of the sensing units.

25 Claims, 9 Drawing Sheets

FOREIGN PATENT DOCUMENTS

| | | |
|---|---|---|
| CN | 1726420 | 1/2006 |
| JP | 62-142589 U | 9/1987 |
| JP | 03-164825 A | 7/1991 |
| JP | 09-160719 | 6/1997 |
| JP | 10-105106 | 4/1998 |
| JP | 10-505182 A | 5/1998 |
| JP | 10-233670 A | 9/1998 |
| JP | 2000-066837 A | 3/2000 |
| JP | 2001-282440 | 10/2001 |
| JP | 2001-350592 | 12/2001 |
| JP | 2002-366305 | 12/2002 |
| JP | 2003-337657 A | 11/2003 |
| JP | 2005-352490 A | 12/2005 |
| JP | 2006-042028 | 9/2006 |
| JP | 2007-510949 A | 4/2007 |
| KR | 1020040065379 | 7/2004 |
| KR | 10-0456154 | 10/2004 |
| KR | 10-0469499 | 1/2005 |
| WO | 9607966 A | 3/1996 |
| WO | 2005043229 A1 | 5/2005 |

OTHER PUBLICATIONS

English Language Abstract, KR Patent First Publication No. 10-0456154, Oct. 28, 2004, 1 page.

English Language Abstract, KR Patent First Publication No. 1020040065379, Jul. 22, 2004, 1 page.

English Language Abstract, JP Patent First Publication No. 2002-366305, Dec. 20, 2002, 1 page.

English Language Abstract, JP Patent First Publication No. 2001-282440, Oct. 12, 2001, 1 page.

English Language Abstract, JP Patent First Publication No. 2001-350592, Dec. 21, 2001, 1 page.

English Language Abstract, JP Patent First Publication No. 10-105106, Apr. 24, 1998, 1 page.

English Language Abstract, JP Patent First Publication No. 09-160719, Jun. 20, 1997, 1 page.

* cited by examiner

DISPLAY DEVICE AND VOLTAGE ADJUSTING METHOD THEREFOR

CROSS-REFERENCE TO RELATED APPLICATION

This application claims priority to and the benefit of Korean Patent Application No. 10-2006-0018085 filed in the Korean Intellectual Property Office on Feb. 24, 2006, the entire contents of which are incorporated herein by reference.

BACKGROUND OF THE INVENTION

1. Field of the Invention

The present invention relates to a display device and, more particularly, to a touch-sensitive display device which is stabilized against voltage changes.

2. Description of the Related Art

A liquid crystal display (LCD) is representative of display devices that include two display panels having pixel electrodes and a common electrode, respectively. A liquid crystal layer having dielectric anisotropy is interposed between the two display panels. The pixel electrodes are arranged in a matrix and connected to corresponding switching elements such as thin film transistors (TFTs) that are sequentially supplied with data voltages. The common electrode is disposed over the entire surface of the display panel and supplied with a common voltage. The liquid crystal layer interposed between the pixel electrode and the common electrode constitutes a liquid crystal capacitor which, together with the switching element connected thereto, serves as the basic unit of a pixel.

The data voltages applied to the two electrodes generate an electric field of varying intensity in the liquid crystal layer that controls the transmittance of light passing through the liquid crystal layer to display a desired image. In order to prevent degradation of the liquid crystal layer that could be caused by long-term application of a unidirectional electric field, the polarities of data voltages with respect to the common voltage are inverted in units of a frame, a row, or a pixel.

A liquid crystal display with a touch screen panel attached can detect the touch of a user's finger or touch pen and the position of the touch. However, an attached touch screen increases cost and decreases yield because of the additional process of attaching the touch screen panel to the liquid crystal display. In addition, the luminance of the liquid crystal panel is decreased and the thickness of the liquid crystal display is increased.

In order to solve these problems, it has been proposed to build-in touch-sensing elements along with the thin film transistors and variable capacitors of the display region. In order to accurately detect the occurrence and the position of touch, an initial output voltage, that is, the voltage output from each of the sensing elements, which are not touched, needs to be in an appropriate range.

However, if the level of the initial output voltage from each of the sensing elements is not constant, the determination of touch may vary. Such factors as the state of the display, the ambient temperature, or other environmental factors may cause the sensing element output voltage to vary, making it difficult to accurately determine the touch state.

SUMMARY OF THE INVENTION

The present invention provides a touch-sensitive display device and a voltage adjusting method that improves the reliability of sensing the occurrence and location of touch.

According to one aspect of the exemplary embodiment of the present invention, the voltages of a plurality of initial sensing signals output from a plurality of sensing units are adjusted based on initial sensing signals, comprising: selecting an initial one of the initial sensing signals; determining whether the voltage of the selected initial sensing signal is in a predetermined range; starting an adjustment of the initial sensing signal when the voltage of the selected initial sensing signal is not in the predetermined range; stopping the adjustment of the initial sensing signal when the initial sensing signal is in the predetermined range.

In the aforementioned embodiment of the present invention, the selected initial sensing signal may advantageously be the sensing signal having the maximum value.

According to another aspect of the exemplary embodiment of the present invention, the initial sensing signal may be a vertical or horizontal sensing signal.

The initial sensing signal may be made up of vertical and horizontal sensing signals. After the voltage of the vertical sensing signal is adjusted, the voltage of the horizontal sensing signal may be adjusted. In addition, after the voltage of the horizontal sensing signal is adjusted, the voltage of the vertical sensing signal may be adjusted. Determining the occurrence and location of touch may include determining whether the voltage of an initial sensing signal is in a predetermined range. When the voltage of the initial sensing signal is in the predetermined range, starting the calculation of the touched positions; and maintaining a standby state until the operation of calculating the occurrence of touch and the touched positions on the sensing units is finished.

Another embodiment of the present invention provides a display device including: a plurality of sensing data lines; a plurality of sensing units that output sensing signals through the sensing data lines; a signal selector that selects one sensing signal among the sensing signals; an automatic voltage adjusting unit that adjusts the magnitude of the selected sensing signal to be in a predetermined range; and a voltage generator that adjusts the magnitude of the voltage applied to the sensing data line based on the output from the automatic voltage adjusting unit.

In the aforementioned embodiment of the present invention, the signal selector may select an initial sensing signal having a maximum value among the plurality of initial sensing signals output from the sensing units when the screen is not touched.

The automatic voltage adjusting unit: determines whether or not the magnitude of the initial sensing signal is in a predetermined range and determines whether or not the initial sensing signal needs to be adjusted; commands the voltage generator to adjust the initial sensing signal when the magnitude of the initial sensing signal is not in the predetermined range; determines whether or not the voltage generator is adjusting the initial sensing signal in response to the command; stops commanding the voltage generator to adjust the initial sensing signal when the operation of adjusting the initial sensing signal starts; and determines whether or not the voltage generator completes the operation of adjusting the initial sensing signal.

The initial sensing signal may be a vertical initial sensing signal. In addition, the initial sensing signal may be an initial horizontal sensing signal.

The display device may further include a touch-determining unit that determines the occurrence of touch and the touched positions on the sensing units, wherein the automatic voltage-adjusting unit further controls the determining of the occurrence of touch and the touched positions on the sensing units performed by the touch-determining unit.

Determining the occurrence of touch and the touched positions may include determining whether or not the magnitude of the initial sensing signal is within a predetermined range when the adjusting of the sensing signal is completed, commanding the touch determining unit to calculate the occurrence of touch and the touched positions on the sensing units when the magnitude of the initial sensing signal is in the predetermined range, and maintaining a standby state until the touch determining unit completes the calculation operation on the occurrence of touch and the touched positions on the sensing units.

The display device may further include an interface between the automatic voltage-adjusting unit and the voltage generator and between the automatic voltage-adjusting unit and the touch-determining unit. The interface may be an SPI (serial peripheral interface). The display device may further include a reset signal input unit that applies a predetermined voltage to the sensing data line to reset the sensing data line with the predetermined voltage. The voltage generator may adjust the magnitude of the predetermined voltage.

BRIEF DESCRIPTION OF THE DRAWINGS

An exemplary embodiment of the present invention will be described with reference to the accompanying drawings, in which.

DETAILED DESCRIPTION OF THE EMBODIMENTS

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display as a display device according to an exemplary embodiment of the present invention is described in detail with reference to FIGS. 1 to 5.

Figure 1:
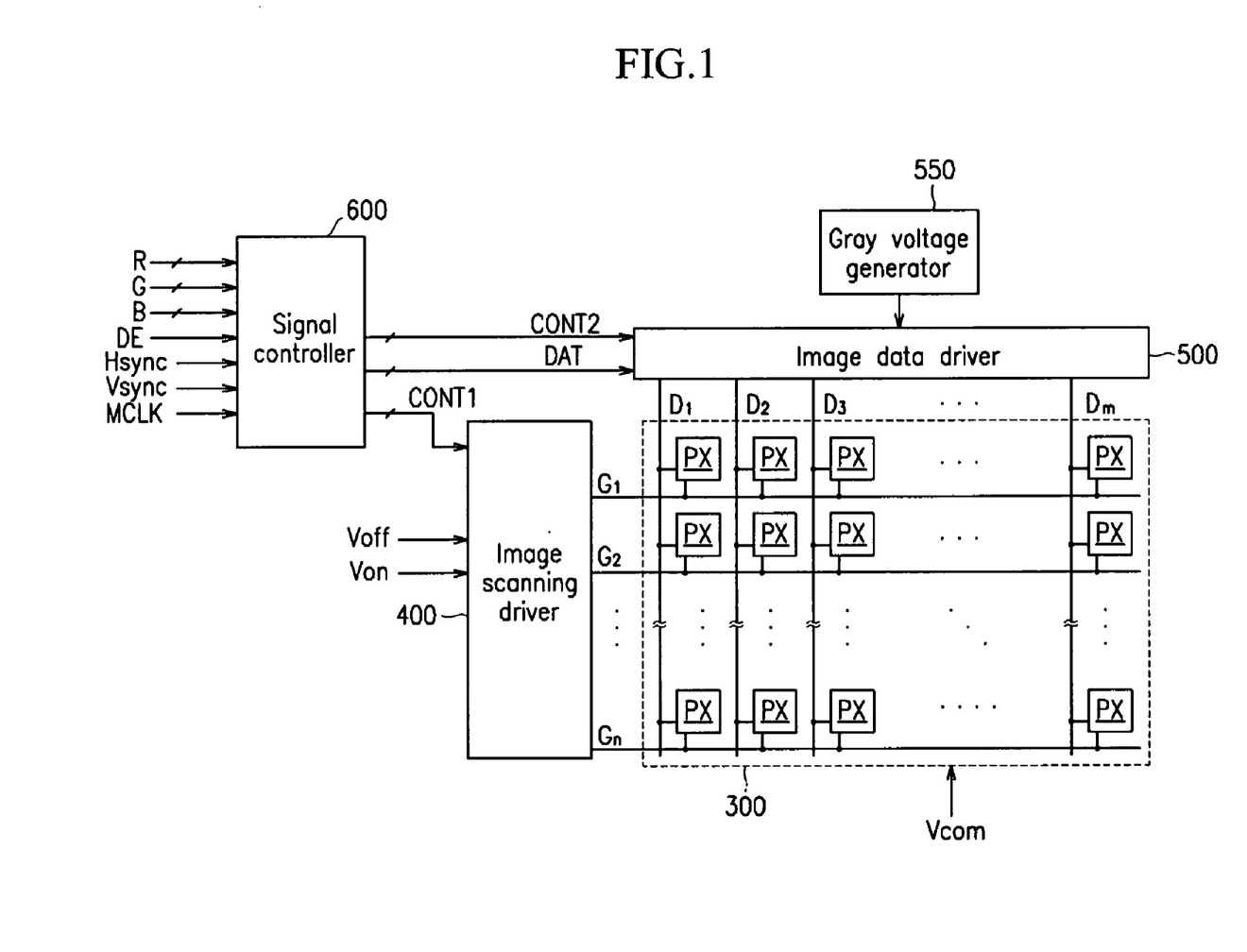
FIG. 1 is a block diagram showing a liquid crystal display and pixels thereof according to an exemplary embodiment of the present invention.
Figure 3:
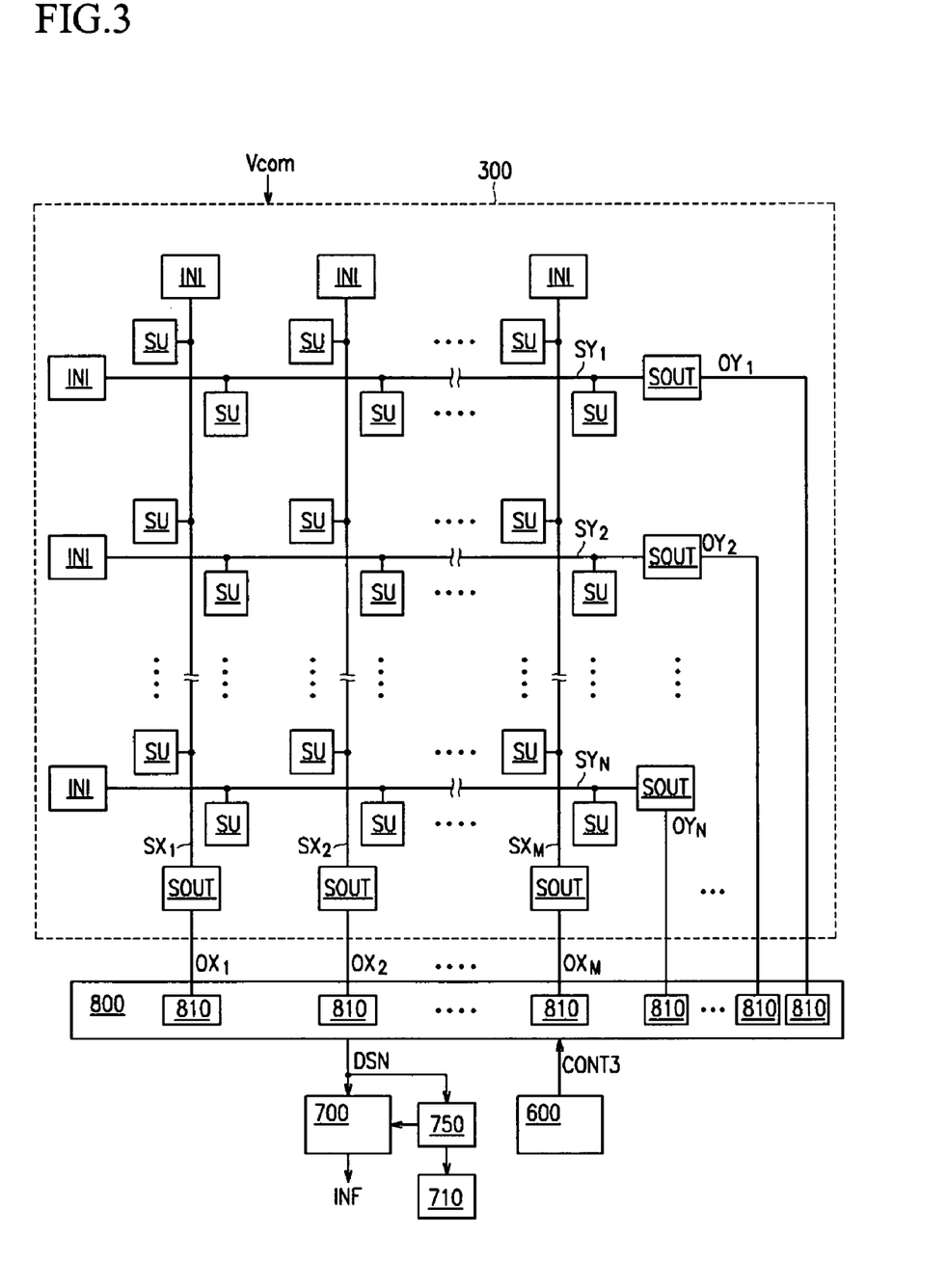
FIG. 3 is a block diagram showing the liquid crystal display and sensing units thereof according to the exemplary embodiment of the present invention.

Referring to FIGS. 1 and 3, the liquid crystal display according to an exemplary embodiment of the present invention includes a liquid crystal panel assembly 300, an image scanning driver 400 connected to the liquid crystal panel assembly 300, an image data driver 500, a sensing signal processor 800, a gray voltage generator 550 connected to image data driver 500, a touch determiner 700 connected to sensing signal processor 800, a voltage adjusting unit 750 connected to sensing signal processor 800, a voltage generator 710 connected to voltage adjusting unit 750, and a signal controller 600 that controls the aforementioned components.

Referring to FIGS. 1 to 4B, the liquid crystal panel assembly 300 includes a plurality of display signal lines $G_1$ to $G_n$ and $D_1$ to $D_m$, a plurality of pixels PX that are connected to the display signal lines $G_1$ to $G_n$ and $D_1$ to $D_m$ and arranged substantially in a matrix, a plurality of sensing signal lines $SY_1$ to $SY_N$ and $SX_1$ to $SX_M$, and RL, a plurality of sensing units SU that are connected to the sensing signal lines $SY_1$ to $SY_N$ and $SX_1$ to $SX_M$ and arranged substantially in a matrix, a plurality of reset signal input units INI each of which is connected to one end of each of the sensing signal lines $SY_1$ to $SY_N$ and $SX_1$ to $SX_M$, a plurality of sensing signal output units SOUT each of which is connected to the other end of each of the sensing signal lines $SY_1$ to $SY_N$ and $SX_1$ to $SX_M$, and a plurality of output data lines $OY_1$ to $OY_N$ and $OX_1$ to $OX_M$ each of which is connected to each of sensing signal output units SOUT.

Figure 2:
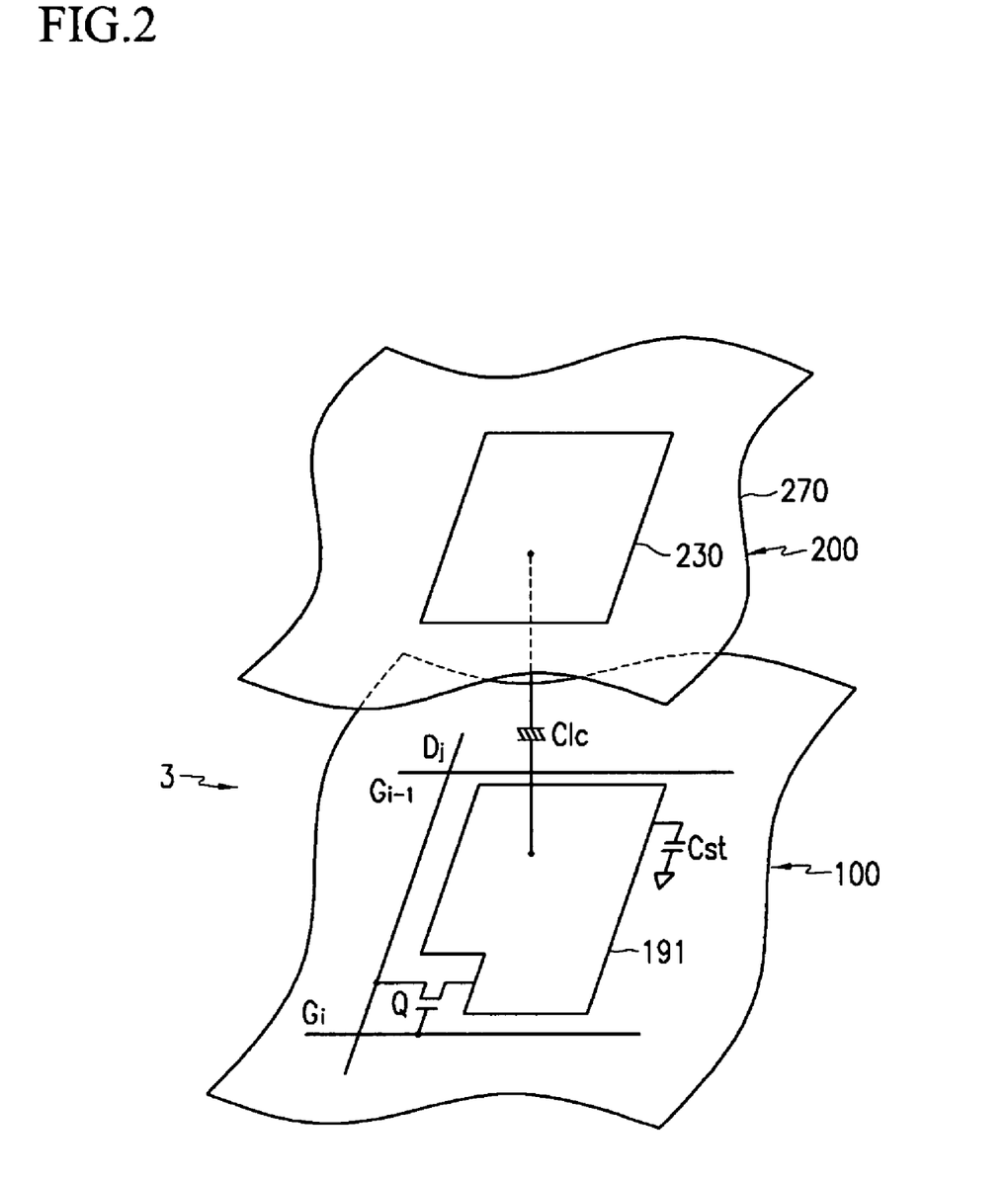
FIG. 2 is an equivalent circuit diagram of one pixel of the liquid crystal display according to the exemplary embodiment of the present invention.
Figure 5:
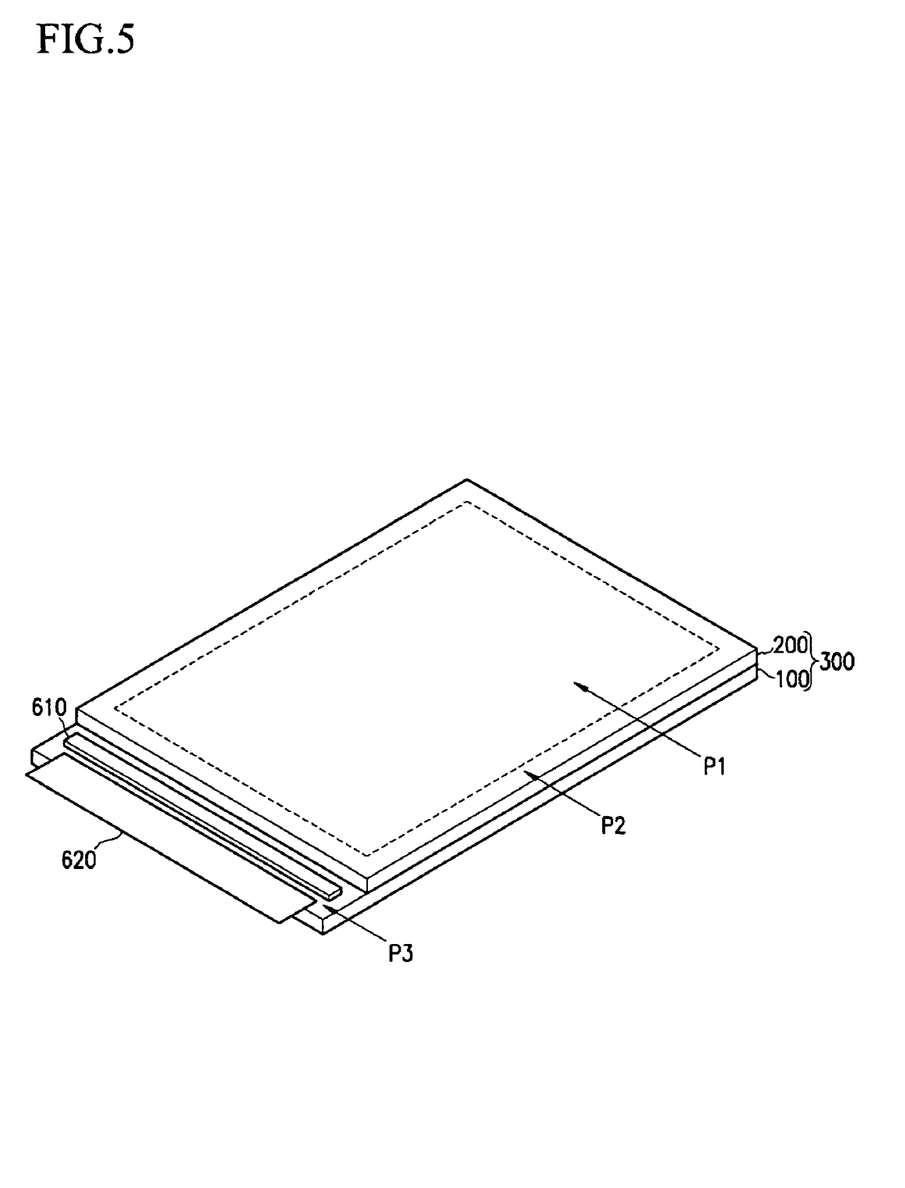
FIG. 5 is a schematic diagram showing the liquid crystal display according to the exemplary embodiment of the present invention.

Referring to FIGS. 2 and 5, the liquid crystal panel assembly 300 includes a thin film transistor array panel 100 and a common electrode panel 200 that face each other, a liquid crystal layer 3 interposed therebetween, and spacers (not shown) that form a gap between the two panels 100 and 200 and that can be slightly compressed and deformed.

The display signal lines $G_1$ to $G_n$ and $D_1$ to $D_m$ include a plurality of image scanning lines $G_1$ to $G_n$ that transmit image-scanning signals and image data lines $D_1$ to $D_m$ that transmit image data signals. The sensing signal lines $SY_1$ to $SY_N$, $SX_1$ to $SX_M$, and RL include a plurality of horizontal sensing data lines $SY_1$ to $SY_N$ and a plurality of vertical sensing data lines $SX_1$ to $SX_M$ that transmit sensing data signals, and a plurality of reference voltage lines RL that transmit reference voltages having high and low levels and that swing between the high and low levels in a predetermined period. The reference voltage lines RL may be omitted as necessary.

The image scanning lines $G_1$ to $G_n$ and the horizontal sensing data lines $SY_1$ to $SY_N$ are disposed to extend substantially in the row direction in parallel with each other. The image data lines $D_1$ to $D_m$ and the vertical sensing data lines $SX_1$ to $SX_M$ are disposed to extend substantially in the column direction in parallel with each other. The reference voltage lines RL are disposed to extend in the row or column direction.

Each pixel PX includes a switching element Q that is connected to the corresponding ones of the display signal lines $G_1$ to $G_n$ and $D_1$ to $D_m$, a liquid crystal capacitor Clc connected to switching element Q, and a storage capacitor Cst. The storage capacitor Cst may be omitted as needed.

Switching element Q is a three terminal element such as a thin film transistor disposed on thin film transistor array panel 100. Switching element Q has a control terminal connected to one of the image scanning lines $G_1$ to $G_n$, an input terminal connected to one of the image data lines $D_1$ to $D_m$, and an output terminal connected to liquid crystal capacitor Clc and the storage capacitor Cst. The thin film transistor includes amorphous silicon or polysilicon.

Liquid crystal capacitor Clc uses a pixel electrode 191 of thin film transistor array panel 100 and a common electrode 270 of the common electrode panel 200 as its two terminals. Liquid crystal layer 3 is interposed between the two electrodes 191 and 270 and serves as a dielectric material. Pixel electrode 191 is connected to—switching element Q, and—common electrode 270 is disposed on the entire surface of the common electrode panel 200 and supplied with a common voltage Vcom. Unlike common electrode 270 shown in FIG. 2, common electrode 270 may be disposed on thin film transistor array panel 100. In this case, at least one of the two electrodes 191 and 270 may be formed in a shape of a line or a bar. The common voltage Vcom is a constant DC voltage having a predetermined level and may be about 0V.

Storage capacitor Cst, serving as an auxiliary to liquid crystal capacitor Clc, is constructed by overlapping each of separate signal lines (not shown) disposed on thin film transistor array panel 100 and each of the pixel electrodes 191 with an insulator interposed therebetween. Each of the separate signal lines is supplied with a predetermined voltage such as the common voltage Vcom. Alternatively, storage capacitor Cst may be constructed by overlapping pixel electrode 191 and an adjacent image scanning signal line, called a previous image scanning line, with an insulator interposed therebetween.

In order to implement color display, each of the pixels PX uniquely displays one of the primary colors (spatial division), or each of the pixels PX alternately displays the primary colors according to time (temporal division). As a result, a desired color can be obtained by the spatial or temporal sum of the primary colors. An example of the primary colors is the three primary colors red, green, and blue. FIG. 2 shows an example of spatial division. As shown in the figure, each of the pixels PX includes a respective color filter 230—in a region of common electrode panel 200 corresponding to pixel electrode 191. Unlike color filter 230 shown in FIG. 2, the color filter may be provided on or under pixel electrode 191 of thin film transistor array panel 100.

At least one polarizer (not shown) for polarizing light is attached on an outer surface of the liquid crystal panel assembly 300.

Figure 4:
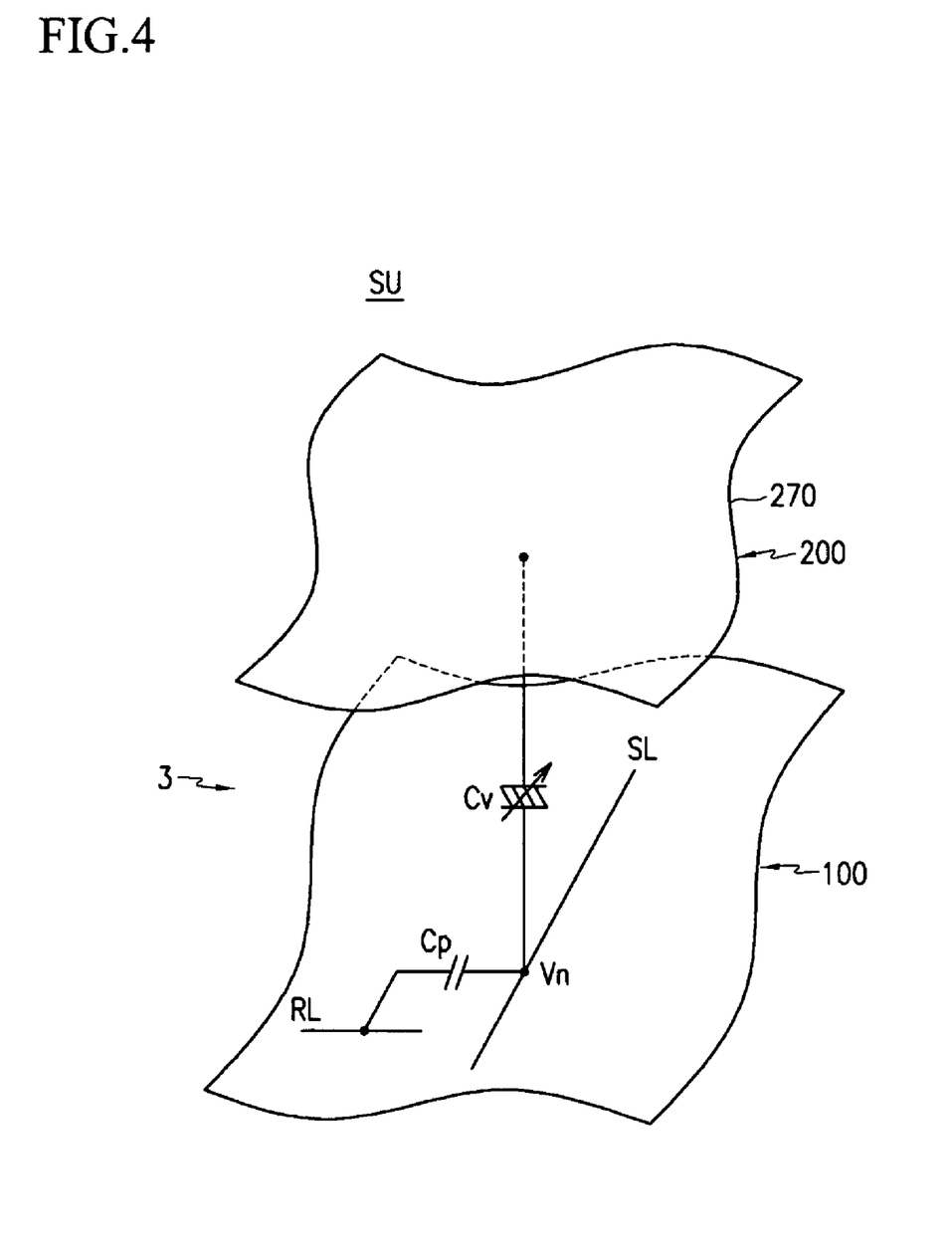
FIG. 4 is an equivalent circuit diagram of one sensing unit of the liquid crystal display according to the exemplary embodiment of the present invention.

As shown in FIG. 4, each of sensing units SU includes a variable capacitor Cv connected to a horizontal or vertical sensing data line (hereinafter, a sensing data line) denoted by reference numeral SL, and a reference capacitor Cp connected between the sensing data line SL and the reference voltage line RL.

Reference capacitor Cp is constructed by overlapping the sensing data line and the reference voltage line RL of thin film transistor array panel 100 with an insulator (not shown) interposed therebetween.

Variable capacitor Cv uses the sensing data line SL of thin film transistor array panel 100 and common electrode 270 of the common electrode panel 200 as two terminals, and liquid crystal layer 3 interposed between the two terminals serves as a dielectric material. The capacitance of the variable capacitor Cv varies with an external stimulus such as a user's touch applied on the liquid crystal panel assembly 300.

When pressure is applied on the common electrode panel 200, the spacers are compressed and deformed, so that the distance between the two terminals varies. As a result, the capacitance of the variable capacitor Cv varies. When the capacitance of the variable capacitor Cv varies, the node voltage between the reference capacitor Cp and the variable capacitor Cv, which highly depends on the capacitance of the variable capacitor Cv, varies. The node voltage Vn is transmitted as a sensing data signal through the sensing data line SL. The occurrence of touch can be determined based on the sensing data signal. The distance between two terminals of the reference capacitor Cp is maintained constant, so that the reference capacitor Cp is almost a constant capacitance. Therefore, the sensing data signal can have a voltage level in a predetermined range, so that the occurrence of touch and the position of touch can be easily determined.

Each of sensing units SU is disposed between two adjacent pixels PX and each is connected to the corresponding horizontal and vertical sensing data lines $SY_1$ to $SY_N$ and $SX_1$ to $SX_M$. The density of pairs of sensing units SU disposed-near intersections the horizontal and vertical sensing data lines $SY_1$ to $SY_N$ and $SX_1$ to $SX_M$ may be about ¼ of the density of dots. Here, one dot includes three pixels PX that are arranged in parallel to each other to represent three primary colors. In addition, one dot represents one color and becomes a unit of resolution of the liquid crystal display. Alternatively, one dot may include four or more pixels PX. In this case, each of the pixels PX can represent one of three primary colors and white.

Where the density of pairs of sensing units SU is ¼ of the density of dots, the horizontal and vertical resolutions of pairs of sensing units SU are ½ of the horizontal and vertical resolutions of the liquid crystal display, respectively. In this case, there may be a pixel row or a pixel column having no sensing unit SU.

A liquid crystal display having the aforementioned density of sensing units SU and the aforementioned density of dots may be employed in character recognition or other applications requiring high accuracy. The resolution of sensing units SU may be designed to be higher or lower, as needed.

According to an exemplary embodiment of the present invention, the space occupied by sensing units SU and sensing data lines SL decreases relatively, so that it is possible to minimize the reductions decrease in the aperture ratio of pixel PX.

Figure 6:
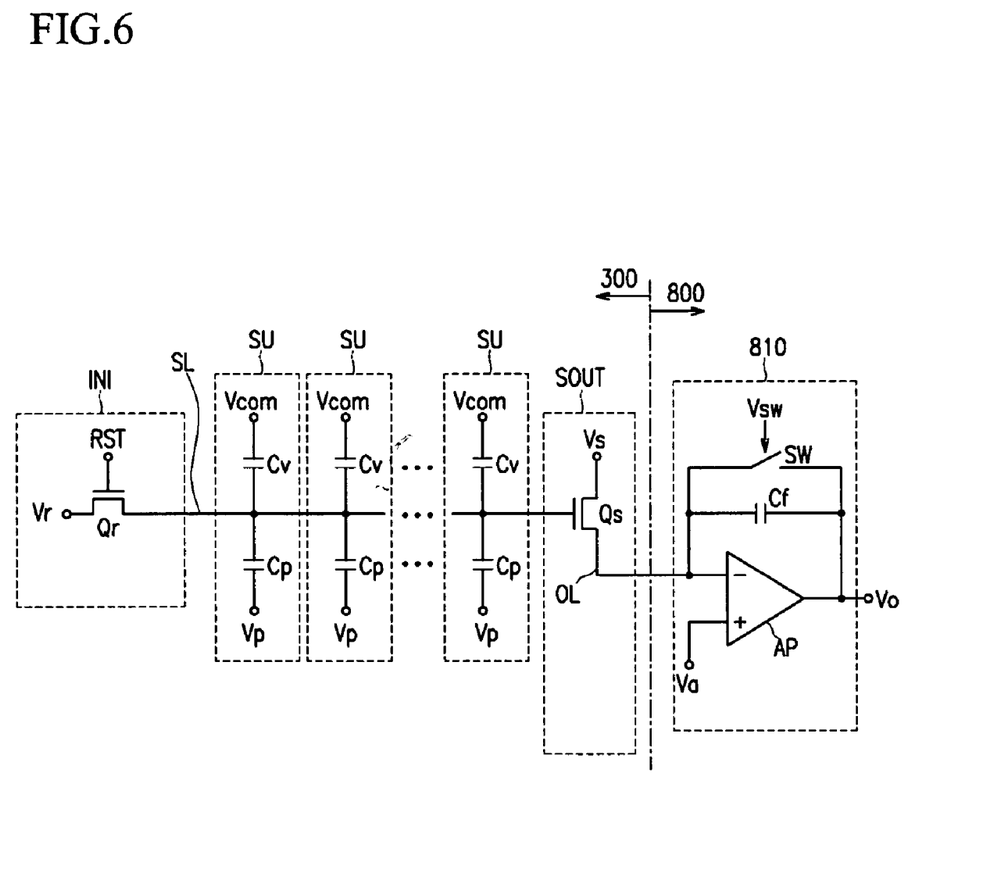
FIG. 6 is an equivalent circuit diagram of a plurality of sensing units connected to one sensing data line in the liquid crystal display according to the exemplary embodiment of the present invention.

As shown in FIG. 6, all the reset signal input units INI have substantially the same structure, and each of the reset signal input units INI includes a reset transistor Qr. Reset transistor Qr is a three terminal element such as a thin film transistor. Reset transistor Qr has a control terminal connected to a reset control signal RST, an input terminal connected to a reset voltage Vr, and an output terminal connected to a sensing data line SL ($SX_1$ to $SX_M$ or $SY_1$ to $SY_N$ in FIG. 3). Reset transistor Qr is disposed in an edge region P2 of the liquid crystal panel assembly 300 where there are no pixels. Reset transistor Qr supplies the reset voltage Vr to the sensing data line SL according to the reset control signal RST.

All sensing signal output units SOUT have substantially the same structure. Each of the sensing signal output units SOUT includes an output transistor Qs. Output transistor Qs is also a three terminal element such as a thin film transistor. Output transistor Qs has a control terminal connected to the sensing data line SL, an input terminal connected to an input voltage Vs, and an output terminal connected to the output data line OL. Output transistor Qs is also disposed in the edge region P2 of the liquid crystal panel assembly 300. Output transistor Qs generates an output signal, such as a current, based on the sensing data signal that flows through the sensing data line SL.

Alternatively, output transistor Qs may generate a voltage signal. Reset transistor Qr and output transistor Qs are thin film transistors formed together with switching element Q.

The output data lines $OY_1$ to $OY_N$ and $OX_1$ to $OX_M$ include a plurality of horizontal and vertical output data lines $OY_1$ to $OY_N$ and $OX_1$ to $OX_M$ connected to the horizontal and vertical sensing data lines $SY_1$ to $SY_N$ and $SX_1$ to $SX_M$ through the sensing signal output units OUT. The output data lines $OY_1$ to $OY_N$ and $OX_1$ to $OX_M$ are connected to sensing signal processor 800. The output data lines $OY_1$ to $OY_N$ and $OX_1$ to $OX_M$ transmit output signals of sensing signal output units SOUT to sensing signal processor 800. The horizontal and vertical output data lines $OY_1$ to $OY_N$ and $OX_1$ to $OX_M$ are disposed to extend substantially in the column direction in parallel to each other.

Returning to FIGS. 1 and 3, gray voltage generator 550 generates two sets of gray voltages (reference gray voltage sets) corresponding to transmittance of pixels. One gray set has a positive value with respect to the common voltage Vcom, and the other gray voltage set has a negative value with respect to the common voltage Vcom.

Image scanning driver 400 is connected to the image scanning lines $G_1$ to $G_n$ of the liquid crystal panel assembly 300 to apply image scanning signals constructed with a combination of gate-on voltage Von for turning on the switching element Q and a gate-off voltage Voff for turning off the switching element Q to the image scanning lines G1 to Gn.

Image data driver 500 is connected to the image data lines D1 to Dm of liquid crystal panel assembly 300 to select the gray voltages from gray voltage generator 550 and apply the selected gray voltages as the image data signals to the image data lines D1 to Dm. Where gray voltage generator 550 applies a predetermined number of reference gray voltages but not voltages for the entire set of grays, image data driver 500 divides the reference gray voltages to generate the voltages for the entire grays and selects the image data signal among the voltages for the entire grays.

Sensing signal processor 800 includes a plurality of amplifying units 810 connected to the output data lines $OY_1$ to $OY_N$ and $OX_1$ to $OX_M$ of the liquid crystal panel assembly 300.

As shown in FIG. 6, the amplifying units 810 have substantially the same structure. Each amplifying unit 810 includes an amplifier AP, a capacitor Cf, and a switch SW. The amplifier AP has an inversion terminal (−), a non-inversion terminal (+), and an output terminal. The inversion terminal (−) is connected to the output data line OL. The capacitor Cf and the switch SW are connected between the inversion terminal (−) and the output terminal. The non-inversion terminal (+) is connected to a reference voltage Va. The amplifier AP and capacitor Cf constitute a current integrator to integrate the output current from output transistor Qs in a predetermined time interval, thereby generating a sensing signal Vo. Sensing signal processor 800 converts the analog sensing signal Vo from the amplifying units 810 to a digital signal by using an analog-to-digital converter (not shown) to generate a digital sensing signal DSN.

Touch determiner 700 receives the digital sensing signal DSN from sensing signal processor 800 and performs a predetermined process to determine the occurrence of touch, the position of touch, and outputs touch information INF to an external device. Touch determiner 700 monitors operational states of sensing units SU based on the digital sensing signal DSN to control signals applied to sensing units SU.

Voltage adjusting unit 750 controls the sensing signal Vo (hereinafter, referred to as "an initial sensing signal") output from the sensing signal processor 800 when sensing units SU is not touched to be in an appropriate output range based on sensing signal DSN among the digital sensing signals DSN from sensing signal processor 800.

Voltage generator 710 adjusts the magnitude of the reset voltage Vr under the control of voltage adjusting unit 750.

Signal controller 600 controls the operation of image scanning driver 400, image data driver 500, gray voltage generator 550, and sensing signal processor 800.

Drivers 400, 500, 550, 600, 700, 710, 750, and 800 may be attached in the form of at least one IC chip directly on liquid crystal panel assembly 300. Alternatively, drivers 400, 500, 550, 600, 700, 710, 750, and 800 may be mounted on a flexible printed circuit film (not shown) and attached in the form of a tape carrier package (TCP), or mounted on a separate printed circuit board (PCB) (not shown). As a further alternative, drivers 400, 500, 550, 600, 700, 710, 750, and 800, together with the signal lines $G_1$ to $G_n$, $D_1$ to $D_m$, $SY_1$ to $SY_N$, $SX_1$ to $SX_M$, $OY_1$ to $OY_N$, and $OX_1$ to $OX_M$, RL, and thin film transistors Q may be integrated into liquid crystal panel assembly 300.

Referring to FIG. 5, liquid crystal panel assembly 300 is divided into a display area P1, an edge region P2, and an exposed region P3. Most of the pixels PX, sensing units SU, and signal lines $G_1$ to $G_n$, $D_1$ to $D_m$, $SY_1$ to $SY_N$, $SX_1$ to $SX_M$, $OY_1$ to $OY_N$, $OX_1$ to $OX_M$, and RL are disposed in the display area P1. Common electrode panel 200 includes a light blocking member (not shown) such as a black matrix that covers most of the edge region P2 to block external light. Since common electrode panel 200 is smaller than thin film transistor array panel 100, a portion of thin film transistor array panel 100 is exposed to form region P3. On region P3, chip 610 is mounted, and a flexible printed circuit (FPC) board 620 is attached.

Chip 610 includes drivers for driving the liquid crystal display such as image scanning driver 400, image data driver 500, gray voltage generator 550, signal controller 600, touch determiner 700, voltage generator 710, voltage adjusting unit 750, and sensing signal processor 800. Since the drivers 400, 500, 550, 600, 700, 710, 750, and 800 are integrated into chip 610, the mounting area can be reduced, and power consumption can be lowered. As needed, at least one of the drivers or at least one circuit element thereof may be disposed outside chip 610.

The image signal lines $G_1$ to $G_n$ and $D_1$ to $D_m$ and the sensing data lines $SY_1$ to $SY_N$ and $SX_1$ to $SX_M$ extend to the exposed region P3 to be connected to the associated drivers 400, 500, and 800.

FPC board 620 receives signals from external devices and transmits the signals to chip 610 or liquid crystal panel assembly 300. For convenience of connection, the end portion of the FPC board 620 is generally constructed with connecters (not shown).

Now, displaying and sensing operations of the liquid crystal display are described in detail.

Signal controller 600 receives input image signals R, G, and B and input control signals for controlling display thereof from an external device (not shown). The input image signals R, G, and B contain luminance information of the pixels PX. The luminance can be represented with a predetermined number of grays, for example 1024 ($=2^{10}$), 256 ($=2^8$), or 64 ($=2^6$) grays. As an example of the input control signals, there are a vertical synchronization signal Vsync, a horizontal synchronizing signal Hsync, a main clock signal MCLK, and a data enable signal DE.

Signal controller 600 processes the input image signals R, G, and B according to operating conditions of the liquid crystal panel assembly 300 and image data driver 500 based on the input image signals R, G, and B and the input control signals to generate image scanning control signals CONT1, image data control signal CONT2, and sensing data control signals CONT3. After that, signal controller 600 transmits the image scanning control signals CONT1 to image scanning driver 400, the image data control signals CONT2 and the processed image signal DAT to image data driver 500, and the sensing data control signals CONT3 to sensing signal processor 800.

The image scanning control signals CONT1 include a scanning start signal STV for indicating scan starting and at least one clock signal for controlling output of a gate-on voltage Von. The image scanning control signals CONT1 may also include an output enable signal OE for defining a duration time of the gate-on voltage Von.

The image data control signals CONT2 include a horizontal synchronization start signal STH for indicating data transmission for a row of pixels PX, a load signal LOAD for commanding to apply image data voltages to the image data lines $D_1$ to $D_m$, and a data clock signal HCLK. The image data control signals CONT2 may further include an inversion signal RVS for inverting a polarity of voltage of the image data voltage I with respect to the common voltage Vcom (hereinafter, "the polarity of the image date voltage with respect to the common voltage being abbreviated to an "image data voltage").

In response to the image data control signals CONT2 from signal controller 600, image data driver 500 receives the digital image signals DAT for a row of the pixels PX, selects the gray voltages corresponding to the digital image signals DAT, converts the digital image signals DAT to analog image data voltages, and applies the analog image data voltages to the image data lines $D_1$ to $D_m$.

In response to the image scanning control signals CONT1 from signal controller 600, image scanning driver 400 applies the gate-on voltage Von to the image scanning lines $G_1$ to $G_n$ to turn on the switching elements Q connected to the image scanning lines $G_1$ to $G_n$. As a result, the image data voltages applied to the image data lines D1 to $D_m$ are applied to the pixels PX connected to the turned-on on the switching elements Q.

The difference between the voltage of the image data voltage and the common voltage Vcom is represented with a charge voltage of liquid crystal capacitor Clc, that is, the pixel voltage. Alignment of the liquid crystal molecules varies according to the intensity of the pixel voltage, so that polarization of light passing through liquid crystal layer 3 changes. The change in the polarization results in a change in transmittance of the light due to the polarizer attached to the liquid display panel assembly 300, so that a desired image can be displayed.

In units of one horizontal period (or 1H), that is, one period of the horizontal synchronization signal Hsync and the data enable signal DE, the aforementioned operations are repetitively performed to sequentially apply the gate-on voltages Von to all the image scanning lines $G_1$ to $G_n$, so that the image data voltages are applied to all the pixels PX. As a result, one frame of image is displayed.

When one frame ends, the next frame starts, and a state of the inversion signal RVS applied to image data driver 500 is controlled so that the polarity of the image data voltage applied to each of the pixels PX is opposite to the polarity in the previous frame (frame inversion). At this time, even in one frame, according to the characteristics of the inversion signal RVS, the polarity of the image data voltage flowing through the one image data line may be inverted (row inversion, dot inversion), and the polarities of the image data voltages applied to one pixel row are equal to each other (column inversion, dot inversion).

Sensing signal processor 800 writes the sensing data signals applied through the output data lines $OY_1$ to $OY_N$ and $OX_1$ to $OX_M$ once for each of frames in a porch period between the frames according to the sensing data control signals CONT3. Particularly, it is preferable that sensing signal processor 800 performs a sensing operation in a front porch period ahead of the vertical synchronization signal Vsync. In the porch period, since the sensing data signal is not strongly affected by the driving signals from image scanning driver 400 and image data driver 500, reliability of the sensing data signals can be improved. The reading operation is not necessarily performed every frame, and it may be performed once for a plurality of frames. In addition, two or more reading operations may be performed in one porch period. Alternatively, at least one reading operation may be performed at one frame.

Now, the reading operation for the sensing data signal is described in detail with reference to FIG. 6.

The common voltage Vcom has high and low levels, and swings between the high and low levels in a period of 1H.

The reset control signal RST has a turn-on signal for turning on reset transistor Qr and a turn-off voltage for turning off reset transistor Qr. The gate-on and gate-off voltages Von and Voff may be used as the turn-on and turn-off voltages. Alternatively, other voltages may be used. The turn-on voltage of the reset control signal RST is applied when the common voltage Vcom has the high level.

When the turn-on voltage is applied to reset transistor Qr, reset transistor Qr turns on to apply the reset voltage Vr from the input terminal to the sensing data line SL, so that the sensing data line SL is initialized with the reset voltage Vr. On the other hand, at the start of operations, when a reference voltage Va is applied to the amplifying units 810, a capacitor Cf of the amplifying units 810 is charged with the reference voltage Va, so that a magnitude of an output voltage Vo of an amplifier AP becomes equal to the reference voltage Va.

When the reset control signal RST is at the turn-off voltage Voff, the sensing data line SL is floating, and the voltage applied to the control terminal of output transistor Qs changes. The voltage applied to the control terminal is based on the change in capacitance of the variable capacitor Cv and the variation in the common voltage Vcom when sensing units SU detect the occurrence of touch. Due to the change in voltage, the current of the sensing data signal flowing through output transistor Qs changes.

After the reset control signal RST is changed to have the gate-off voltage Voff, a switching signal Vsw is applied to a switch SW, so that the voltage charged in the capacitor Cf is discharged.

After the predetermined time, sensing signal processor 800 reads the sensing signal Vo. Preferably, the time in which the sensing signal Vo is read is set to be less than the time of 1H after the reset control signal RST becomes the turn-off voltage Voff. Namely, it is preferable that the sensing signal Vo is read before the common voltage Vcom is changed into the high level. This is because the sensing signal Vo changes according to a change in level of the common voltage Vcom.

Since the sensing data signal changes based on the reset voltage Vr, the sensing data signal always has a voltage level in a constant range. Therefore, the occurrence of touch and the position of touch can be easily determined.

The turn-on voltage of the reset control signal RST may be applied when the common voltage Vcom is in the low level. In this case, after the common voltage Vcom is changed into the high level before the common voltage Vcom is changed in the low level, the sensing signal Vo is read. In addition, the reset control signal RST may be synchronized with an image-scanning signal applied to the final image scanning line $G_n$.

After the analog sensing data signals are read by amplifying units 810, sensing signal processor 800 converts the sensing signals Vo to digital sensing signals DSN and transmits the digital sensing signals DSN to touch determiner 700 and voltage adjusting unit 750.

Touch determiner 700 performs suitable processes on the received digital sensing signals DSN to determine the occurrence of touch and the position of touch, and transmits the results thereof to an external apparatus. The external apparatus transmits the image signals R, G, and B based on the results to the liquid crystal display to display the results on a screen or menu selected by a user.

Voltage adjusting unit 750 outputs a control signal for the output range of the sensing signal Vo to be within a predetermined appropriate range based on one initial vertical sensing signal and one initial horizontal sensing signal among the initial sensing signals DSN, for example initial vertical and horizontal sensing signals having maximum values. When the value of the initial vertical and horizontal sensing signals are in the appropriate range, voltage adjusting unit 750 outputs a control signal so as to determine touch occurrence and the touched positions sensing units SU. For the control operation, a control algorithm is built in voltage adjusting unit 750. A method of implementing the control algorithm is described later in detail.

Voltage generator 710 adjusts a predetermined voltage, that is, the reset voltage Vr applied to the reset signal input unit INI, based on the control signal from voltage adjusting unit 750. Therefore, the reset voltage Vr applied to the sensing data line SL is changed when reset transistor Qr turns on and the initial sensing signal Vo changes. In the present exemplary embodiment, the magnitude of the reset voltage Vr is adjusted for the initial vertical sensing signal or the initial horizontal sensing signal to be in an appropriate range, but it is not limited thereto.

Now, a method of implementing the control algorithm built in voltage adjusting unit 750 is described with reference to FIGS. 7 to 9.

Figure 7:
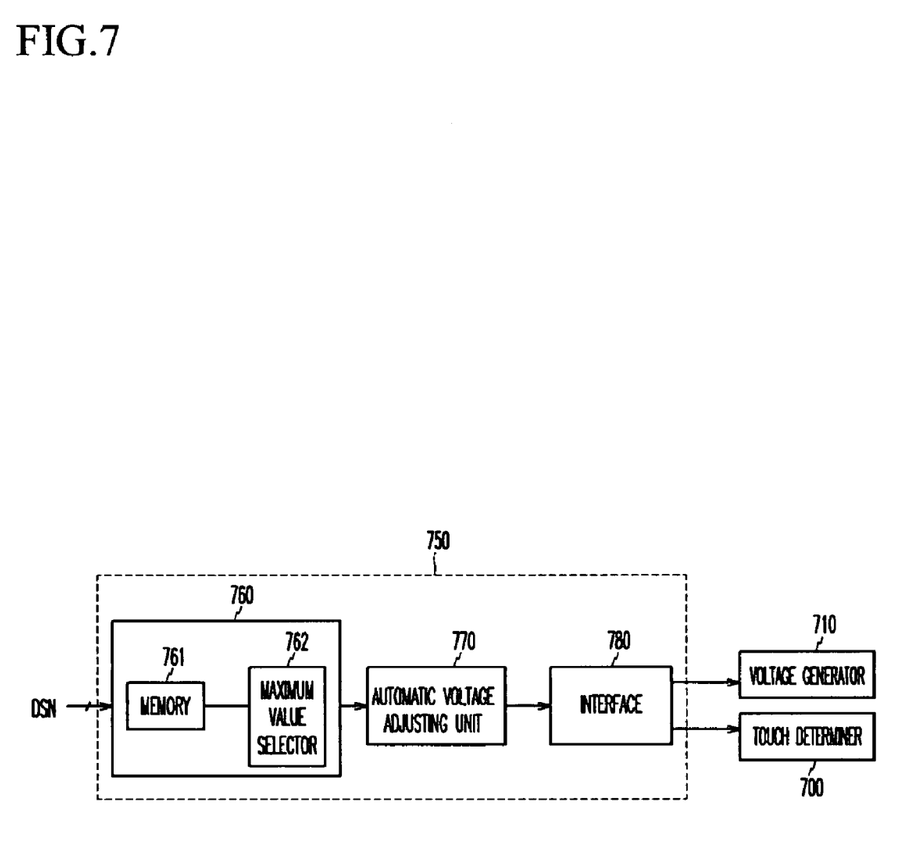
FIG. 7 is a block diagram showing an automatic voltage adjusting unit according to the exemplary embodiment of the present invention.
Figure 8:
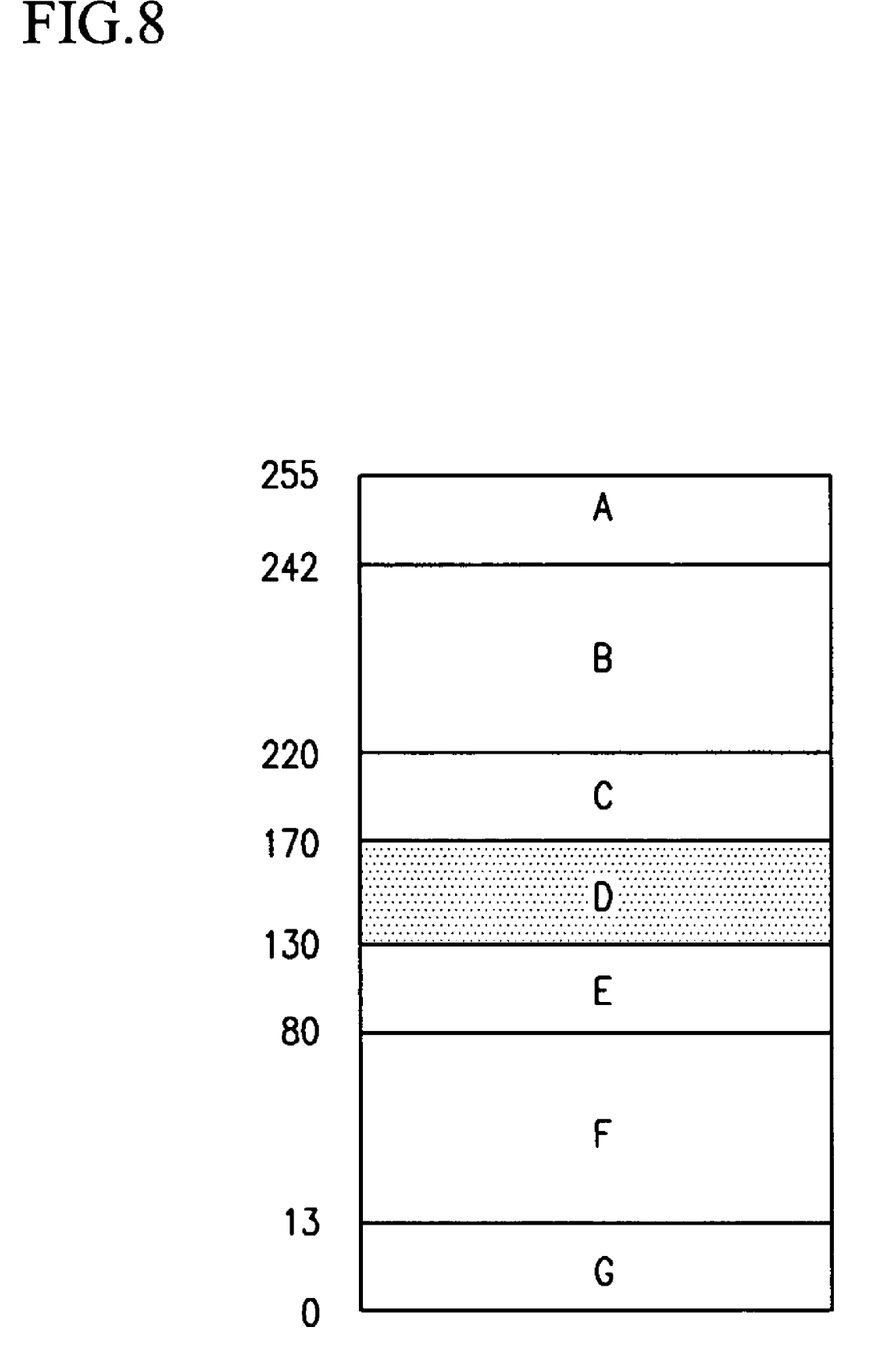
FIG. 8 is a view obtained by partitioning a magnitude of a sensing signal into a plurality of regions according to the exemplary embodiment of the present invention.

FIG. 7 is a block diagram showing an automatic voltage-adjusting unit according to the exemplary embodiment of the present invention, and FIG. 8 is a view obtained by partitioning a magnitude of a sensing signal into a plurality of regions according to the exemplary embodiment of the present invention. FIG. 9 is a flowchart showing a method for implementing the control algorithm for the automatic voltage-adjusting unit according to the exemplary embodiment of the present invention.

As shown in FIG. 7, voltage-adjusting unit 750 includes a receiving unit 760, an automatic voltage-adjusting unit 770, and an interface 780.

The receiving unit 760 includes a memory 761 for temporarily storing the initial sensing signal DSN from the storing sensing signal processor 800, and a maximum value selector 762 for selecting the sensing signal having the maximum value among the initial sensing signals DSN from the memory 761.

Now, operation of voltage adjusting unit 750 will now be described. When a plurality of initial sensing signals DSN input from sensing signal processor 800 are stored in the memory 761 of the receiving unit 760, the maximum value selector 762 selects the initial vertical sensing signal x_max and the initial horizontal sensing signal y_max having the maximum value. Each of the input sensing signals DSN is an 8-bit signal, but the present invention is not limited thereto.

In the present exemplary embodiment, the initial vertical and horizontal sensing signals x_max and y_max having the maximum value are selected. Alternatively, the vertical and horizontal sensing signals having a minimum value may be selected. As a further alternative, a vertical sensing signal having an average value of a plurality of the vertical sensing signals and a horizontal sensing signal having an average value of a plurality of the horizontal sensing signals may be selected. The vertical and horizontal sensing signals may be selected from a plurality of the vertical and horizontal sensing signals in various manners.

The selected initial vertical and horizontal sensing signals x_max and y_max are transmitted to the automatic voltage-adjusting unit 770. The automatic voltage adjusting unit 770 controls the reset voltage Vr applied to the reset signal input units INI connected to the horizontal sensing data line SL or the reset signal input unit INI connected to the vertical sensing data line SL based on the initial sensing signals x_max and y_max. When the values of the initial vertical and horizontal sensing signals x_max and y_max are in the appropriate range, the automatic voltage adjusting unit 770 controls the determining operation of the sensing units.

The control algorithm built in the automatic voltage-adjusting unit 770 is described with reference to FIGS. 8 and 9.

Figure 9:
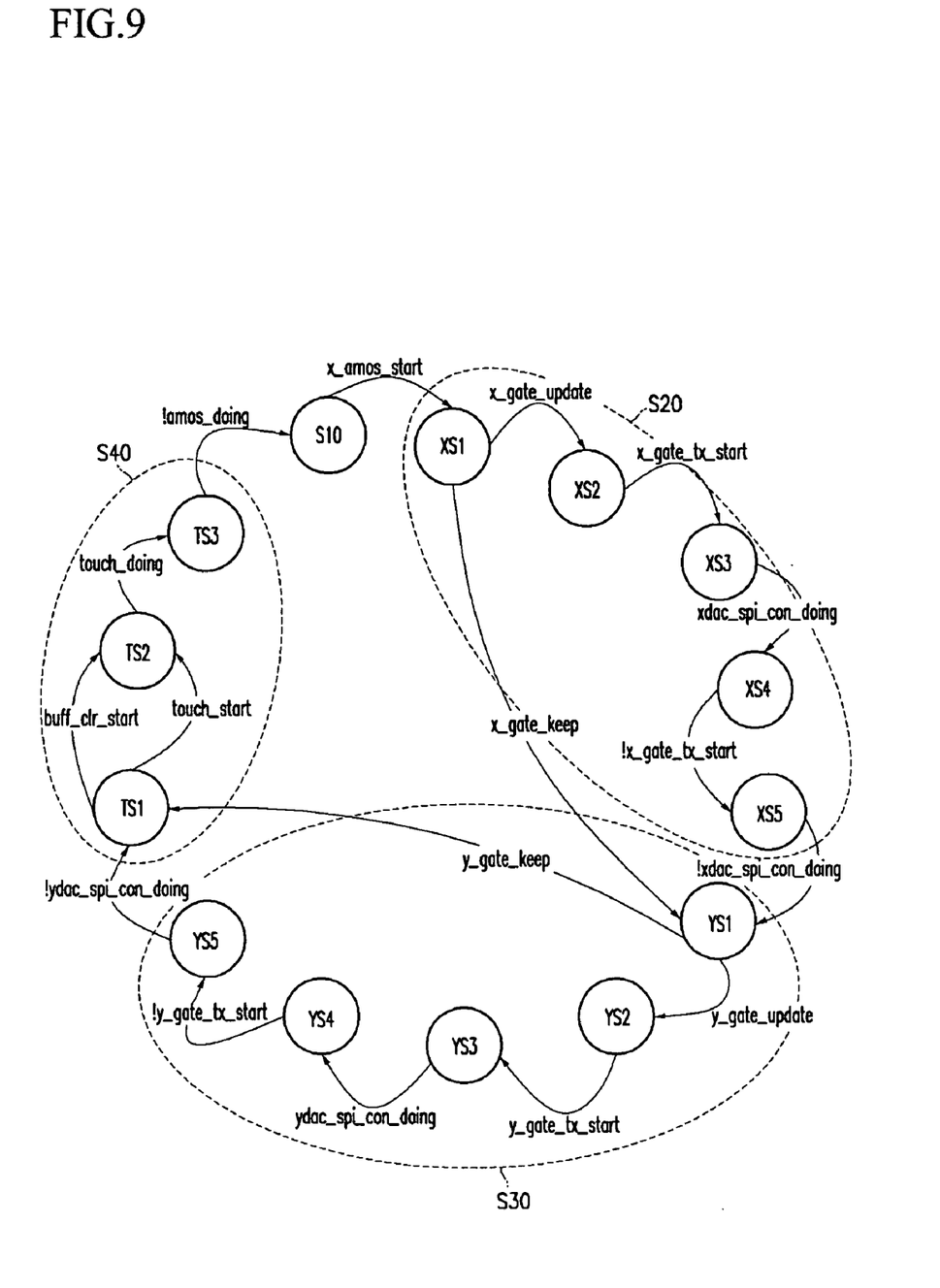
FIG. 9 is a flowchart showing a method of implementing a control algorithm for an automatic voltage-adjusting unit according to an exemplary embodiment of the present invention.

As shown in FIG. 9, the control algorithm includes a standby step S10, a vertical sensing data line voltage-adjusting step S20, a horizontal sensing data line voltage-adjusting step S30, and a touch-determining step S40. In FIG. 9, the vertical sensing data line voltage-adjusting step S20 is performed, and then the horizontal sensing data line voltage-adjusting step S30 is performed. Alternatively, the horizontal sensing data line voltage-adjusting step S30 may be performed and then the vertical sensing data line voltage-adjusting step S20 may be performed. In addition, the automatic voltage-adjusting unit 770 performs the vertical and horizontal sensing data line voltage adjusting steps S20 and S30 and then the touch-determining step S40. However, operations other than the touch-determining step S40 may also be performed.

In the standby step S10, when the first start signal x-amos_start is input from the maximum value selector 762, a determination is made as to which region has the input initial vertical sensing signal x_max and the amount of needed adjustment to the value of the initial vertical sensing signal x_max.

Since the digital sensing signal DSN has an 8-bit value, as shown in FIG. 8, the selected initial vertical and horizontal sensing signals x_max and y_max have a value from 0 to 255. As shown in FIG. 8, the values 0 to 255 are partitioned into a predetermined number of regions A to G, and the range of each region is defined in advance. Therefore, in the exemplary embodiment of the present invention, the magnitude of the reset voltage Vr is adjusted to allow the values of the initial vertical and horizontal sensing signals x_max and y_max selected from the regions to be included in a target region, for example the region D, that is, to have the values 133 to 170.

Therefore, when the first start signal x_amos_start is input in standby step S10, in step XS1 of the vertical sensing data line voltage adjusting step S20, it is determined which region the value of the input initial sensing signal x_max is included, and an algorithm for determining a correction value according to the region is performed. A first update signal x_gate_update or a keep signal x_gate_keep is generated according to a result of operation of the algorithm.

Since the value of the vertical sensing signal x_max input is again not included in the target region D, the first updated signal x_gate_update is a signal indicating a need for correction of the reset voltage Vr. Therefore, when the first update signal x_gate_update is generated, in step XS1, the automatic voltage adjusting unit 770 sets a control signal for changing the reset voltage Vr into the associated magnitude according to the operation of step XS1 and generates a second start signal x_gate_tx_start.

On the other hand, when the keep signal x_gate_keep is generated, the horizontal sensing data line voltage-adjusting step S30 is performed. Since the keep signal x_gate_keep is a signal indicating that the value of the currently input initial vertical sensing signal x_max is included in the target region D and the reset voltage Vr does not need to be corrected, the operation of adjusting the reset voltage Vr applied to the reset signal input unit INI connected to the horizontal sensing data line SL is performed based on the initial horizontal sensing signal y_max.

When the second start signal x_gate_tx_start is generated in step XS2, control signals for changing the reset voltage Vr are transmitted through the interface 780 to voltage generator 710.

Next, in step XS3, the automatic voltage-adjusting unit 770 is in the standby state until the operation of adjusting the reset voltage Vr starts in voltage generator 710. When a first state signal xdac_spi_con_doing indicating that the operation of adjusting the reset voltage Vr is input from voltage generator 710 through interface 780, in step XS4, the control signals generated in step XS2 are cleared, and then a third start signal !x_gate_tx_start is generated.

When the third start signal !x_gate_tx_start is generated, in step XS5, the automatic voltage adjusting unit 770 is in the standby state until the operation of adjusting the reset voltage Vr of voltage generator 710 is completed.

When a second state signal !xdac_spi_con_doing indicating that the operation of adjusting the reset voltage Vr is completed is input from the voltage generator 790 through the interface 780, the horizontal sensing data line voltage adjusting step S30 is performed.

The operations of the horizontal sensing data line voltage-adjusting step S30 are similar to those of the vertical sensing data line voltage-adjusting step S20.

In step YS1, an algorithm for determining which region the value of the input initial horizontal sensing signal y_max is included and determining a correction value according to the region is performed, and after that, a first update signal y_gate_update or a keep signal y_gate_keep is generated.

Therefore, when the first update signal y_gate_update is generated, since the value of the currently input initial vertical sensing signal y_max is not included in the target region D and the reset voltage Vr needs to be corrected, in step YS2, the automatic voltage adjusting unit 770 sets a control signal for changing the reset voltage Vr to the associated magnitude and generates a second start signal y_gate_tx_start.

When the keep signal y_gate_keep is generated, since the value of the currently input initial horizontal sensing signal y_max is included in the target region D and the reset voltage Vr does not need to be corrected, all the initial vertical and horizontal sensing signals x_max and y_max are included in the target region D. Therefore, in step S40, an algorithm for calculating touch occurrence and the touched positions sensing units SU is performed.

When the second start signal y_gate_tx_start is generated, control signals for changing the reset voltage Vr are transmitted through the interface 780 to voltage generator 710.

Next, in step YS3, the automatic voltage-adjusting unit 770 is in the standby state until the operation of adjusting the reset voltage Vr starts in voltage generator 710. When a first state signal ydac_spi_con_doing indicating that the operation of adjusting the reset voltage Vr is input from voltage generator 710 through the interface 780, in step YS4, the control signals generated in step YS2 are cleared, and after that, a third start signal !y_gate_tx_start is generated.

When the third start signal !y_gate_tx_start is generated, in step YS5, the automatic voltage adjusting unit 770 is in the standby state until the operation of adjusting the reset voltage Vr of voltage generator 710 is completed.

When a second state signal !ydac_spi_con_doing indicating that the operation of adjusting the reset voltage Vr is completed is input from the voltage generator 790 through the interface 780, in step S40, the touch determining algorithm for calculating touch occurrence and the touched positions of sensing units SU is performed.

Therefore, when the keep signal y_gate_keep or the second state signal !ydac_spi_con_doing is input, in the TS1, an algorithm of calculating the occurrence of touch and the touched positions on sensing units SU is performed.

Therefore, when the values of the initial vertical and horizontal sensing signals x_max and y_max are determined to be included in the target region D in step TS1, a touch start signal touch_start for commanding calculation of the touched positions on sensing units SU is generated and input through the interface 780 to touch determiner 700. Touch determiner 700 performs an operation of determining the occurrence of touch and the touched positions on sensing units SU based on the sensing signal DSN input from sensing signal processor 800. When the operation is completed, touch determiner 700 transmits a state signal touch_doing indicating that the operation is completed through the interface 780 to the automatic voltage-adjusting unit 770.

However, when the initial vertical and horizontal sensing signals x_max and y_max are not determined to be included in the target region D in step TS1, a clear signal buff_dcr_star is generated and transmitted through the interface 780 to touch determiner 700.

The voltage adjusting operations of the initial vertical or horizontal sensing signal x_max, y_max are performed to adjust the reset voltage Vr through steps XS1 to XS5 and YS1-YS5. However, when desired magnitudes of the initial sensing signals x_max and y_max are not obtained, the clear signal buff_clr_star is generated. For example, in a case where the values of the initial vertical or horizontal sensing signals x_max and y_max are included not in a range (for example, the range C or E) which can be reached by performing one-time voltage adjusting operational cycle XS1 to XS5 or YS1 to YS5 but in other ranges (for example, the range A or G), several voltage adjusting operational cycles XS1 to XS5 and YS1 to YS5 repeat to allow the values to reach the target region D. In this case, in step TS1, the clear signal buff_clr_star is generated.

When the clear signal buff_clr_star is generated, the initial vertical or horizontal sensing signal x_max or y_max is in the state that the initial vertical or horizontal sensing signal x_max or y_max does not have a magnitude suitable for normally determining the operational state of sensing units SU. Therefore, in order to determine touch occurrence and the touched positions sensing units SU, in step TS2, touch determiner 700 clears the vertical and horizontal sensing signals DSN stored in a memory (not shown) or a buffer (not shown) and transmits a state signal touch_doing indicating that the operation is completed through the interface 780 to the automatic voltage adjusting unit 770.

When the state signal touch_doing is input from touch determiner 700, in step TS3, the automatic voltage adjusting unit 770 ends the operations of the control algorithm and generates an ending signal !amos_doing. After that, the automatic voltage-adjusting unit 770 is in the standby state S10.

The automatic voltage adjusting unit 770 is advantageously designed so that an application specific integrated circuit (ASIC) performs a control algorithm having the aforementioned steps to adjust the magnitudes of the initial vertical and horizontal sensing signals x_max and y_max. When the magnitudes of the initial vertical and horizontal sensing signals x_max and y_max are completed, the operation of determining the occurrence of touch and the touched positions on sensing units SU is normally performed.

In the aforementioned exemplary embodiment of the present invention, the sensing units using the variable capacitor and the reference capacitor are exemplified as the sensing unit, but it is not limited thereto. The other sensing elements may be employed in the present invention For example, a pressure sensing unit using the common electrode of the common electrode panel and the sensing data line of the thin film transistor array panel as two terminals of which at least one is designed to protrude and outputting the common voltage as an output signal when the two terminals are physically or electrically connected by a user's touch may be employed. In addition, an optical sensor that outputs different signals according to an intensity of light may be employed. In addition, the present invention may be applied to a display device including two or more kinds of sensing units.

In the aforementioned exemplary embodiments of the present invention, a liquid crystal display is exemplified as a display device, but is not limited thereto. A plasma display device, an organic light emitting diode (OLED) display, or other flat panel displays may be employed in the present invention.

According to the present invention, the voltage applied to a vertical or horizontal data line is automatically adjusted to allow an initial vertical or horizontal sensing signal to lie in an appropriate range. Therefore, the state of touch can be accurately and reliably determined.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of adjusting a voltage of a plurality of initial sensing signals output from a plurality of sensing units of a touch-sensitive display, the method comprising:
    selecting an initial sensing signal from initial sensing signals that is inputted; determining whether the voltage of the selected initial sensing signal is in a predetermined range;
    determining a region that the voltage of the initial sensing signal is in, wherein the region is one of a plurality of partitioned regions, the plurality of partitioned regions being above or below the predetermined range, determining a correction value according to the region, and starting an adjusting operation for adjustment of the initial sensing signal based on the correction value, when the voltage of the selected initial sensing signal is not in the predetermined range;
    determining whether the adjusting operation for the adjustment of the initial sensing signal has placed the initial sensing signal in the predetermined range; and
    stopping the adjustment of the initial sensing signal when the initial sensing signal is in the predetermined range.

2. The voltage adjusting method of claim 1, wherein the selected initial sensing signal is an initial sensing signal having a maximum value among the initial sensing signals.

3. The voltage adjusting method of claim 1, wherein the initial sensing signal is a vertical sensing signal.

4. The voltage adjusting method of claim 1, wherein the initial sensing signal is a horizontal sensing signal.

5. The voltage adjusting method of claim 1, wherein the initial sensing signal is made up of vertical and horizontal sensing signals.

6. The voltage adjusting method of claim 5, wherein, after the voltage of the vertical sensing signal is adjusted, the voltage of the horizontal sensing signal is adjusted.

7. The voltage adjusting method of claim 5, wherein, after the voltage of the horizontal sensing signal is adjusted, the voltage of the vertical sensing signal is adjusted.

8. The voltage adjusting method of claim 1, further comprising determining the occurrence of touch of the sensing units and the position of touch.

9. The voltage adjusting method of claim 8, wherein the determining of the occurrence of touch and the touched positions comprises:
    when the operation of adjusting the initial sensing signal is completed, determining whether or not the voltage of the initial sensing signal is in the predetermined range;
    when the voltage of the initial sensing signal is in the predetermined range, commanding calculation of the occurrence of touch and the touched positions on the sensing units; and
    maintaining a standby state until the operation of calculating the occurrence of touch and the touched positions on the sensing units is finished.

10. The voltage adjusting method of claim 9, wherein, when the voltage of the initial sensing signal is not in the predetermined range, the step of the occurrence of touch and the touched positions further comprises commanding clearing of data stored in a storage unit so as to calculate the occurrence of touch and the touched positions on the sensing units.

11. A display device comprising:
    a plurality of sensing data lines;
    a plurality of sensing units that output a plurality of sensing signals through the sensing data lines;
    a signal selector that selects one sensing signal among the sensing signals;
    an automatic voltage adjusting unit that determines a region that a magnitude of the sensing signal is in, determines a correction value according to the region, and controls the magnitude of the selected sensing signal based on the correction value to be in a predetermined range, wherein the region is one of a plurality of partitioned regions, the plurality of partitioned regions being above or below the predetermined range; and
    a voltage generator that applies a voltage to the sensing data line based on the output from the automatic voltage-adjusting unit.

12. The display device of claim 11, wherein the signal selector selects an initial sensing signal having a maximum value among a plurality of initial sensing signals output of the sensing units when there is no occurrence of touch.

13. The display device of claim 12, wherein, the automatic voltage-adjusting unit: determines whether the magnitude of the selected initial sensing signal is in a predetermined range and whether there is an operation of adjusting the initial sensing signal; when the magnitude of the initial sensing signal is not in the predetermined range, commands the voltage generator to adjust the initial sensing signal, and determines whether the voltage generator completes the operation of adjusting the initial sensing signal.

14. The display device of claim 13, wherein the initial sensing signal is a vertical initial sensing signal.

15. The display device of claim 13, wherein the initial sensing signal is an initial horizontal sensing signal.

16. The display device of claim 13, further comprising a touch-determining unit that determines the occurrence of touch and the touched positions on the sensing units, wherein the automatic voltage-adjusting unit further controls an operation of determining the occurrence of touch and the touched positions on the sensing units performed by the touch-determining unit.

17. The display device of claim 16, wherein the determining of the occurrence of touch and the touched positions comprises:
when the adjusting of the sensing signal is completed,
determining whether or not the magnitude of the initial sensing signal is in a predetermined range;
when the magnitude of the initial sensing signal is in the predetermined range,
commanding the touch determining unit to calculate the occurrence of touch and the touched positions on the sensing units; and
maintaining a standby state until the touch-determining unit completes the calculation operation on the occurrence of touch and the touched positions on the sensing units.

18. The display device of claim 17, wherein, when the magnitude of the initial sensing signal is not in a predetermined range, the step of determining the occurrence of touch and the touched positions further comprises commanding the touch determining unit to clear data stored in a storage unit so as to calculate the occurrence of touch and the touched positions on the sensing units.

19. The display device of claim 18, further comprising an interface between the automatic voltage-adjusting unit and the voltage generator and between the automatic voltage-adjusting unit and the touch-determining unit.

20. The display device of claim 19, wherein the interface is an SPI (serial peripheral interface).

21. The display device of claim 11, further comprising a reset signal input unit that applies a predetermined voltage to the sensing data line to reset the sensing data line with the predetermined voltage.

22. The display device of claim 21, wherein the voltage generator adjusts the magnitude of the predetermined voltage.

23. A touch-sensitive display device having a viewing area, comprising:
a plurality of variable capacitance touch sensing units disposed throughout the viewing area of the display device;
a voltage generator for applying a predetermined voltage to the sensing units;
a touch-determining unit monitoring the voltage of the sensing units to determine the occurrence of touch and calculating the location of positions determined to have been touched; and
a voltage-adjusting unit for controlling the operation of the voltage generator, the voltage-adjusting unit determining a region that a value of a sensing signal is in and determining a correction value for the sensing signal according to the region, wherein the region is one of a plurality of partitioned regions, the plurality of partitioned regions being above or below the predetermined range.

24. The touch-sensitive display device according to claim 23 wherein the voltage-adjusting unit determines whether the voltage of the sensing units is in a predetermined range, the voltage-adjusting unit permitting the touch-determining unit to calculate the touched positions when the voltage is within the predetermined range and maintaining a standby state until the operation of calculating the occurrence of touch and the touched positions on the sensing units is finished.

25. The touch-sensitive display device according to claim 24 wherein when the voltage of the sensing units is not in the predetermined range the voltage generator adjusts the magnitude of the voltage applied to the sensing units based on the output from the voltage-adjusting unit.

* * * * *